United States Patent
Luniewski et al.

[11] Patent Number: 5,968,997
[45] Date of Patent: Oct. 19, 1999

[54] CONTINUOUS PROCESS FOR IRRADIATING OF POLYTETRAFLUORINEETHYLENE (PTFE)

[75] Inventors: Robert Luniewski, Smithtown, N.Y.; William B. Neuberg, Perrinville, N.J.

[73] Assignee: Shamrock Technologies, Inc., Newark, N.J.

[21] Appl. No.: 09/208,117

[22] Filed: Dec. 9, 1998

[51] Int. Cl.[6] .................................................. C08J 3/28
[52] U.S. Cl. ................ 522/156; 250/434; 241/57; 241/79.1; 241/79; 204/157.15; 204/157.44
[58] Field of Search ................ 522/156; 250/434; 241/57, 79, 79.1; 204/157.15, 157.44

[56] References Cited

U.S. PATENT DOCUMENTS

| | | | |
|---|---|---|---|
| 3,116,226 | 12/1963 | Brown | 204/154 |
| 3,322,565 | 5/1967 | Smith | 427/566 |
| 3,527,940 | 9/1970 | Balanca et al. | 250/434 |
| 3,766,031 | 10/1973 | Dillon | 204/159.2 |
| 3,878,164 | 4/1975 | Lott | 260/42.27 |
| 4,029,870 | 6/1977 | Brown et al. | 526/255 |
| 4,036,718 | 7/1977 | Brwon et al. | 204/159 |
| 4,311,570 | 1/1982 | Cowen et al. | 402/157.1 R |
| 4,748,005 | 5/1988 | Neuberg et al. | 422/186 |
| 4,777,192 | 10/1988 | Neuberg et al. | 522/156 |
| 5,149,727 | 9/1992 | Luniewski | 522/156 |
| 5,253,535 | 10/1993 | Mccown | 73/861 |
| 5,260,351 | 11/1993 | Logothetis | 522/152 |
| 5,296,113 | 3/1994 | Luniewski | 204/157.15 |
| 5,434,421 | 7/1995 | Burth et al. | 250/434 |

Primary Examiner—James J. Seidleck
Assistant Examiner—Sanza McClendon
Attorney, Agent, or Firm—Baker & Botts

[57] ABSTRACT

A system for continuously processing PTFE by irradiation and grinding includes a processing vessel having first and second horizontally adjacent agitators in first and second transversely adjacent vessel portions. The bottom of the vessel has a step between the portions whereat heated air is injected for agitating and grinding the PTFE.

6 Claims, 6 Drawing Sheets

5,968,997

CONTINUOUS PROCESS FOR IRRADIATING OF POLYTETRAFLUORINEETHYLENE (PTFE)

BACKGROUND OF INVENTION

This invention relates to processes for irradiating and grinding PTFE to reduce the molecular weight and render the material grindable to a fine particle powder, which can be used as a dry lubricant in paint and ink.

An early description of irradiation of PTFE is contained in U.S. Pat. No. 3,766,031 to Dillon. According to this patent material was placed in trays and subjected to irradiation.

U.S. Pat. Nos. 4,748,005 and 4,777,192, which are owned by the assignee of the present invention, discloses commercial batch processing of PTFE wherein, the material is placed in a ribbon blender and wherein electron beam radiation is directed into a portion of the blender while the material is agitated by the blender. The blender is provided with cooling either by a water jacket or by direct injection of water into the vessel. The ribbon blender is operated to continuously move the material into and out of the irradiation zone, thereby to achieve uniform irradiation.

U.S. Pat. No. 5,149,727 discloses a processing vessel which includes two vessel portions, each having a paddle blender agitator. Air is injected into the process material to promote cooling, coupled with simultaneous irradiation and grinding. An air classifier is used to draw airborne fine particle PTFE from the vessel for recovery. U.S. Pat. No. 5,296,113 discloses a similar system wherein the agitation is provided by use of injected high pressure air, and wherein material in continuously fed to the processing vessel and extracted by an air classifier to achieve a continuous process.

It is an object of the present invention to provide an improved method and apparatus for processing PTFE.

SUMMARY OF THE INVENTION

According to the invention an improvement is provided in an apparatus including a processing vessel for processing PTFE by irradiation and grinding. According to the invention the vessel includes transversely horizontally adjacent first and second vessel portions having corresponding first and second agitators arranged for rotation about a longitudinal axis. The inner floor of the vessel has a step between the first and second vessel portions, so that the inner floor of the first vessel portion is lower than the inner floor of the second vessel portion. A plurality of air nozzles are provided for injecting air toward the first vessel portion, the nozzles being mounted on a substantially vertical portion of the step.

In a preferred arrangement the first agitator rotates in a direction against the direction of air from the air nozzles in the lower part of the first vessel portion. Preferably the second agitator is arranged for rotation about its longitudinal axis in the same rotational direction as the first agitator, so that the agitators move in opposite directions relative to each other at the center of the vessel. The transverse outer wall of the second vessel portion can be cylindrical and have an interior space less than one inch from the periphery of the second agitator. An electron beam source can be arranged for irradiating PTFE material at the top of the second vessel portion.

In accordance with the invention, there is provided apparatus for preparing scrap PTFE for processing and for supplying the PTFE to a processing vessel. The apparatus includes a chopper for cutting scrap PTFE into granular chips, a blender for receiving the chips from the chopper and for agitating the chips to promote flow, and a conveyor for receiving the chips from an outlet of the blender and for carrying the chips toward the processing vessel.

In accordance with the invention, there is provided an improved process for irradiating and grinding PTFE in a processing vessel. According to the improved process, pressurized air at a temperature of 400 to 700° F. is injected into the vessel for grinding the PTFE, and the processing vessel open to admit ambient air drawn into the vessel in a volume 2 to 5 times the volume of the pressurized air.

For a better understanding of the present invention, together with other and further objects, reference is made to the following description, taken in conjunction with the accompanying drawings, and its scope will be pointed out in the appended claims.

DESCRIPTION OF THE PREFERRED EMBODIMENT

Figure 1:
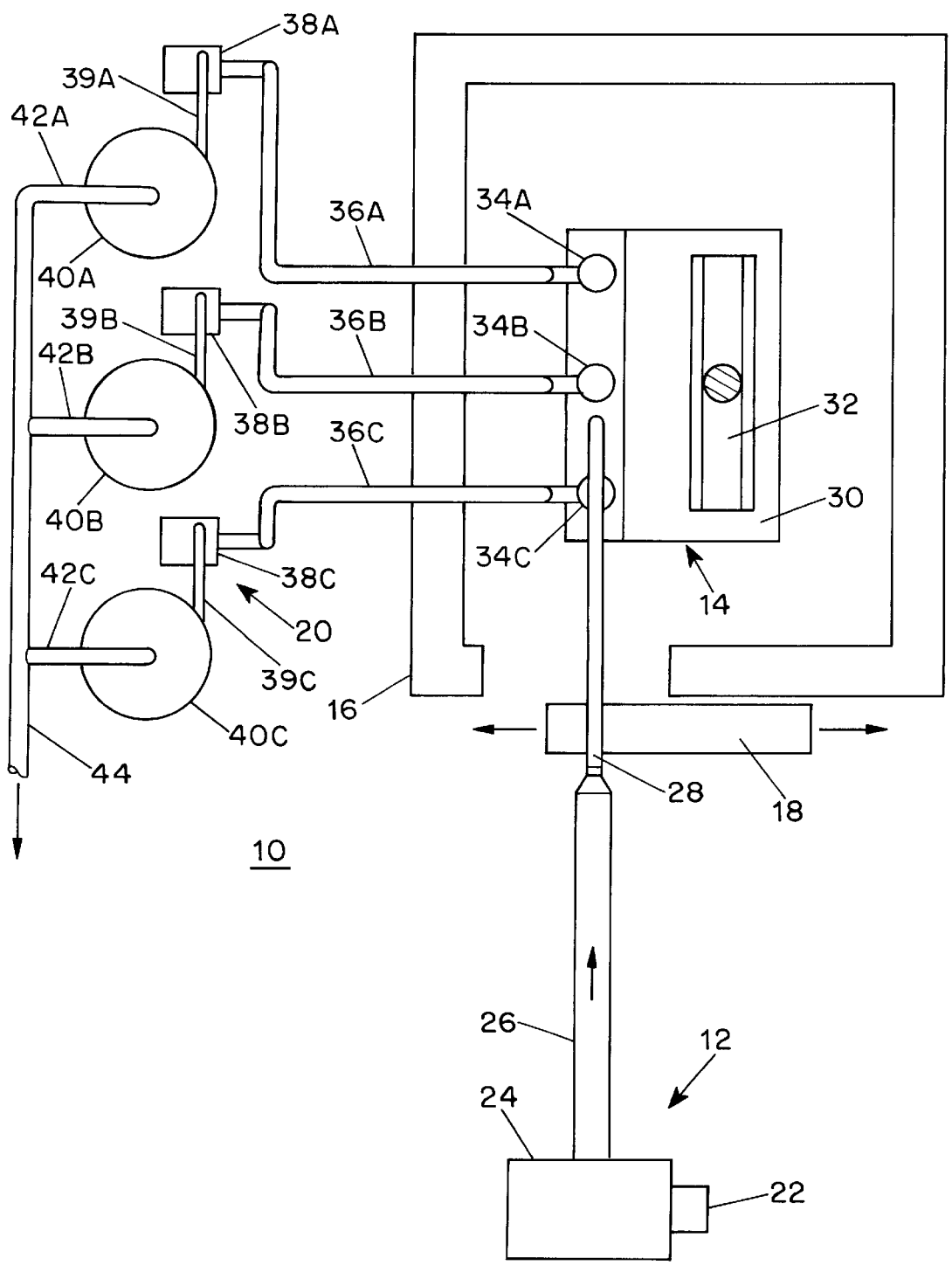
FIG. 1 is a top view of a system for processing PTFE in accordance with features of the present invention.

Referring to FIG. 1, there is illustrated a top view of a system 10 which is for continuous processing of PTFE by irradiation and grinding. The system 10 includes apparatus 12 for preparing PTFE and supplying PTFE for processing, particulary for initial preparation of scrap PTFE, such as scrap tape, tubes, heels and cones. The system further includes a processing apparatus 14 for carrying out the irradiation process, which is enclosed in a radiation enclosure 16 having a door 18. Processed PTFE dust is collected in dust collecting apparatus 20.

Figure 3:
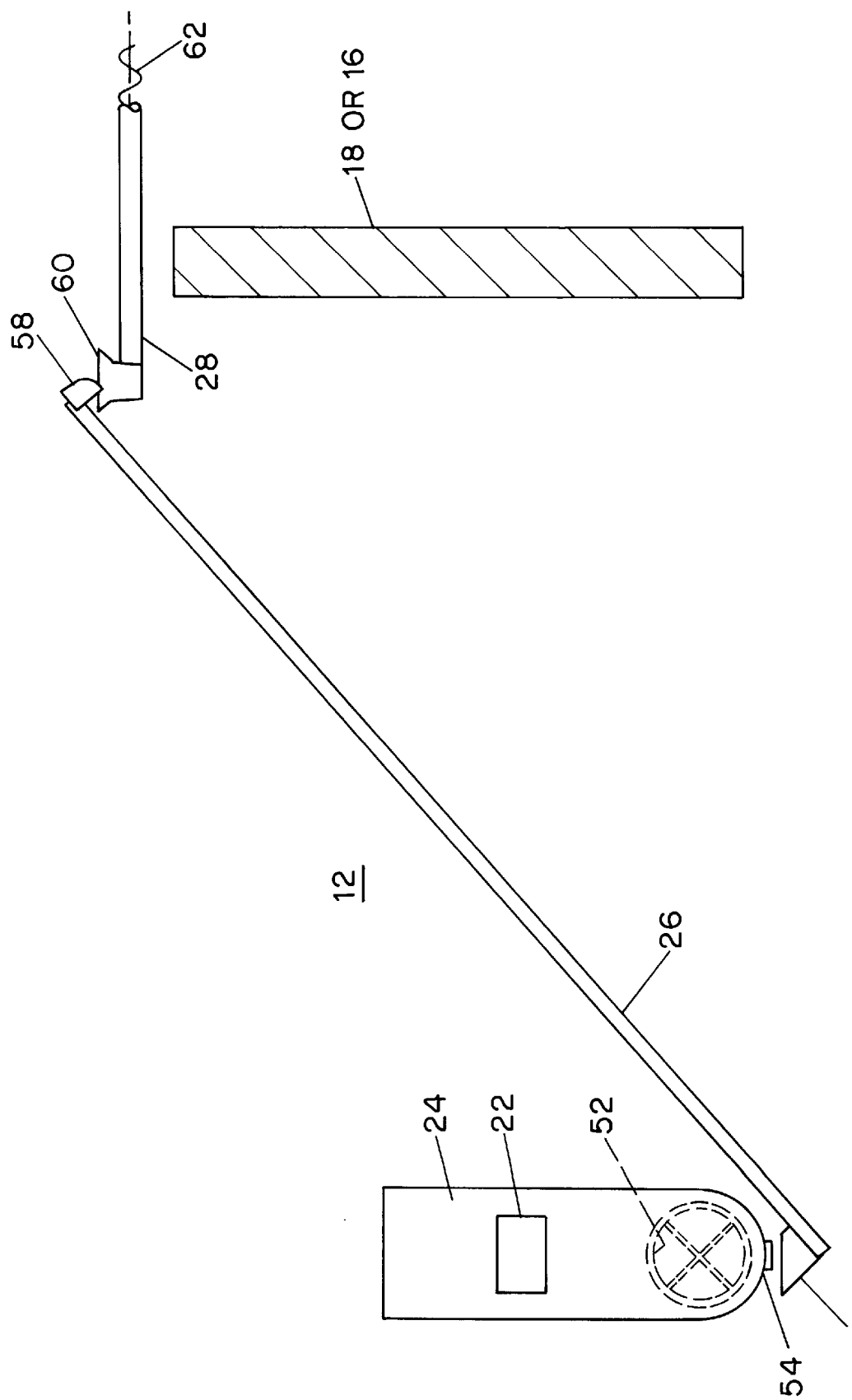
FIG. 3 is an elevation plan view of an apparatus of the FIG. 1 system for preparing scrap PTFE for processing.

Prior to introducing materials such as scrap tape, tube, heels and cones into an irradiation processing vessel, it is necessary and advisable to render the material into granular form. In accordance with the invention, preparation apparatus 12, shown in the top view of FIG. 1 and the side view of FIG. 3, includes a chopper 22 for receiving solid material to be processed and for mechanically cutting the material into granular chips having length, width and thickness preferably in the range of a fraction of an inch. A suitable chopper is a granulator. In a preferred practice, chopper 22 is provided with an arrangement for measuring the electrical load, such as an ammeter, so that an operator by observing the ammeter can avoid overloading the chopper with bulky pieces of scrap material. Chopper 22 is arranged on a wall of a tall ribbon blender 24 having an extended height, such that granular chips from chopper 22 fall into the interior of blender 24 and are capable of being agitated by a ribbon agitator 52 therein. By thus agitating the chips they are rendered capable of easily flowing out of a gated opening 54 at the bottom of blender 24 and into a feed 56 of a mechanical conveyor 26. Mechanical conveyor 26 elevates the material to a level above the radiation shield 16 or radiation shield door 18. A chute 58 of conveyor 26 discharges particles into a receiving funnel 60 of a screw conveyor 28 having a helical conveyor 62. The material is carried by screw conveyor 28 and discharged into processing vessel 14 as required. The extended height of blender 24 enables storage of granular or chipped PTFE for supplying the processing vessel as required. To enable chopper 22 to be at a convenient height for operation by a worker, the lower end of blender 24 can be below floor level, e.g. in a well.

Figure 2:
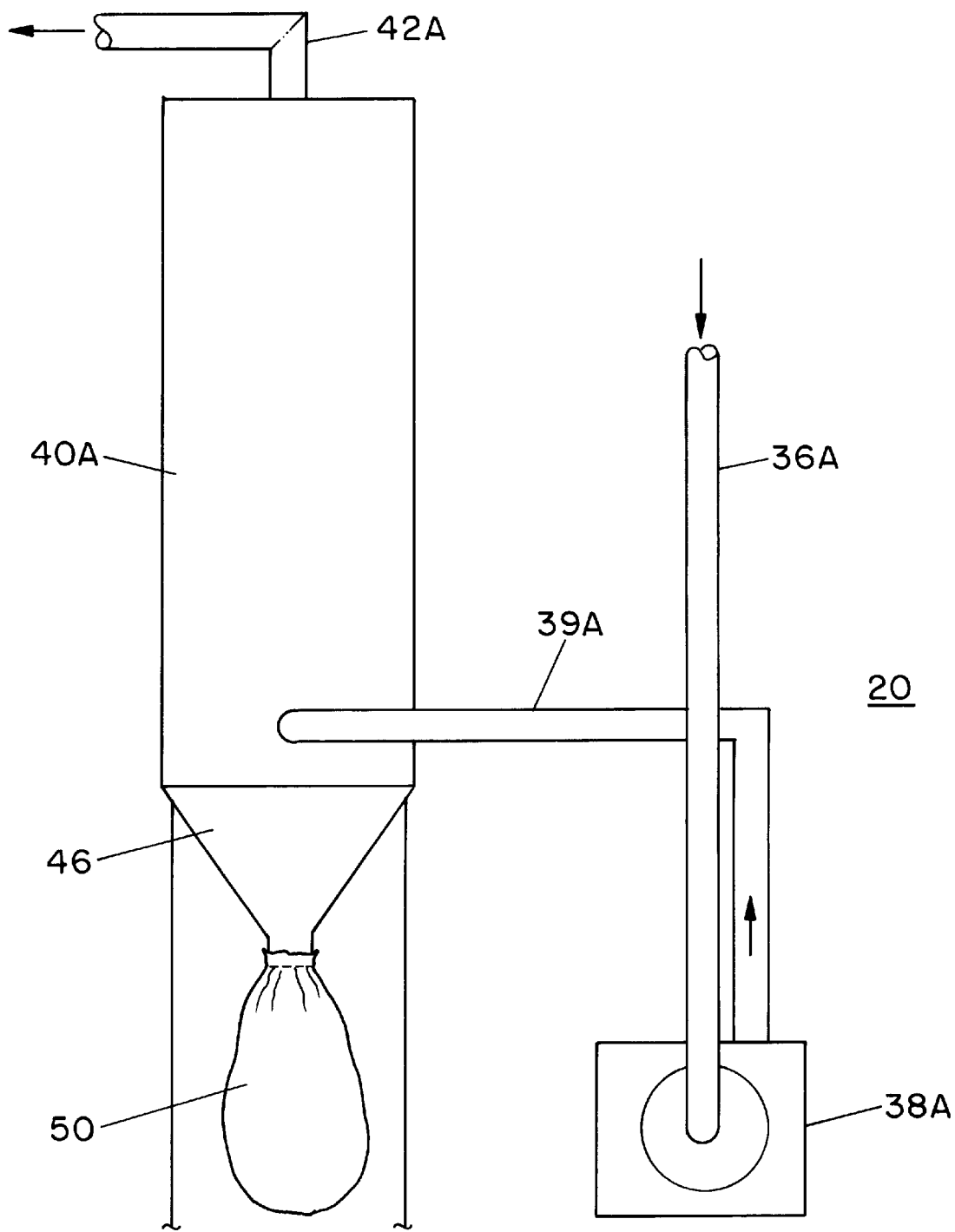
FIG. 2 is an elevation plan view of the dust collectors used in the FIG. 1 system.

Processing apparatus 14 is arranged on the interior of a radiation shield 16 preferably consisting of concrete walls in the range of 3 or more feet in thickness. A door 18 of similar material and thickness is arranged to close the opening of radiation chamber 16. Door 18 may ride on tracks or overhead rails between the open and closed position. According to good practice, no accessible structures are above radiation chamber 16, so that it is not necessary to provide shielding in the upward direction. Processing apparatus 14 includes a vessel 30 and electron beam source 32. Material to be processed is provided to vessel 30 through screw conveyor 28 as required by detection of material levels in vessel 30. Processed material comprising airborne PTFE powder particles, preferably having a particle size in the range of about 10 microns or less, are extracted from processing vessel 30 by classifiers 34A, 34B and 34C. Corresponding blowers 38A, 38B and 38C are provided to draw air and particles through conduits 36A, 36B and 36C and force the airborne particles through conduits 37A, 37B and 37C into cyclone separators 40A, 40B and 40C. Each of the separators 40 includes a corresponding air outlet 42 through which air is extracted for discharge into the atmosphere after removal of airborne powdered material. As shown in FIG. 2, the recovered powder is discharged through lower funnel 46 of separator 40 into a collection bag 50 for sale or further processing.

Figure 4:
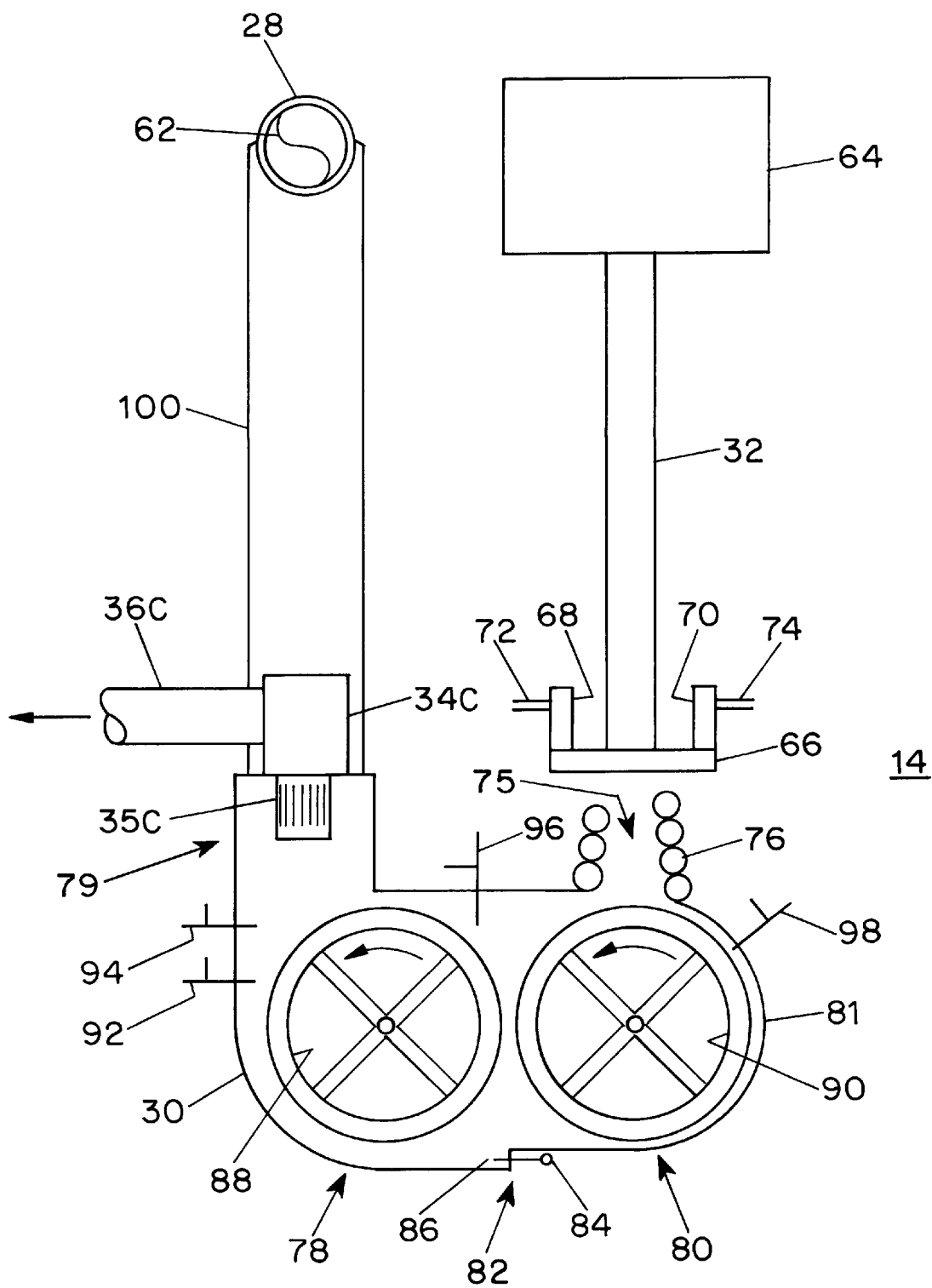
FIG. 4 is a cross-sectional view of the processing vessel of FIG. 1.
Figure 5:
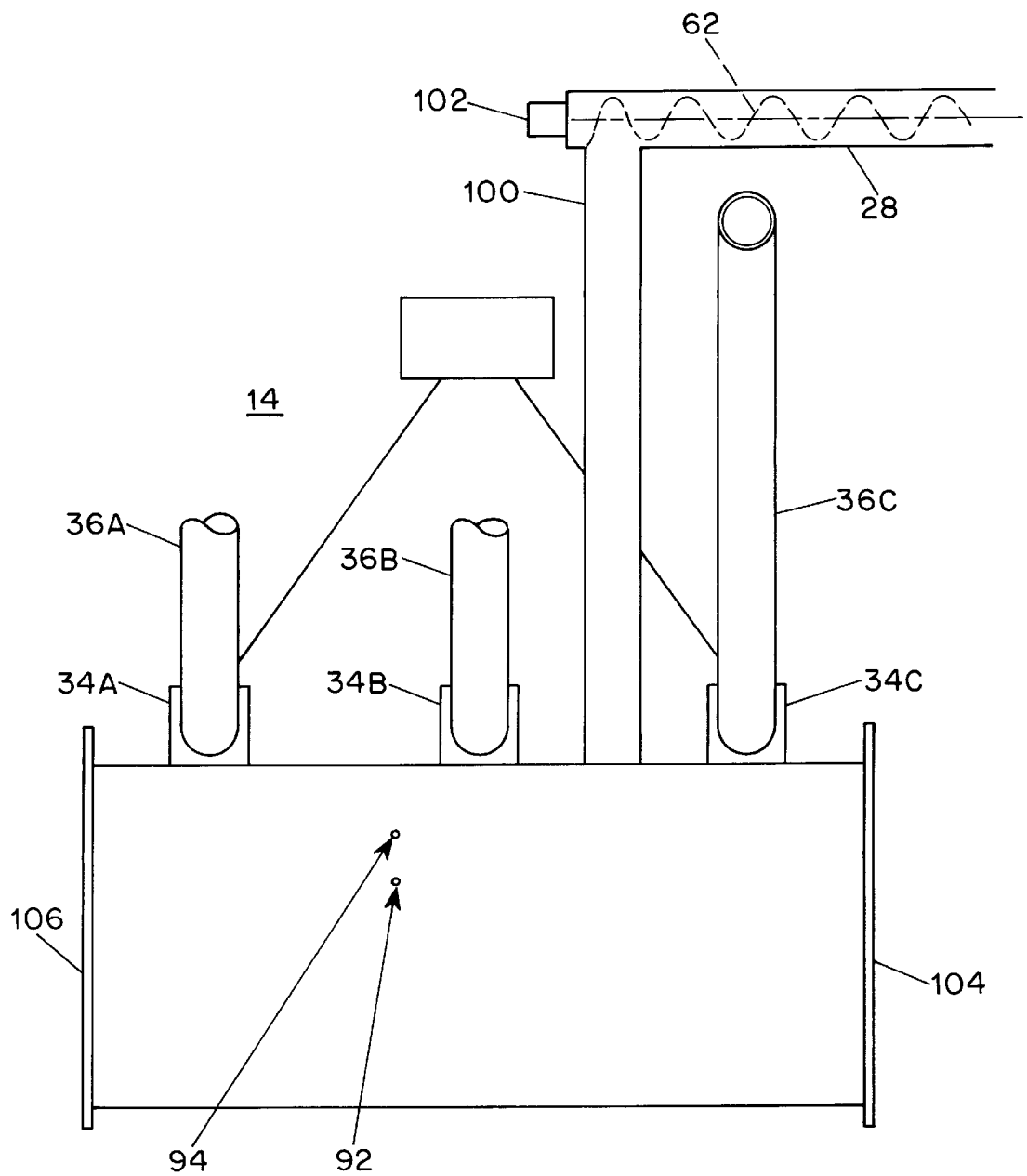
FIG. 5 is a first side elevation plan view of the FIG. 4 processing vessel.
Figure 6:
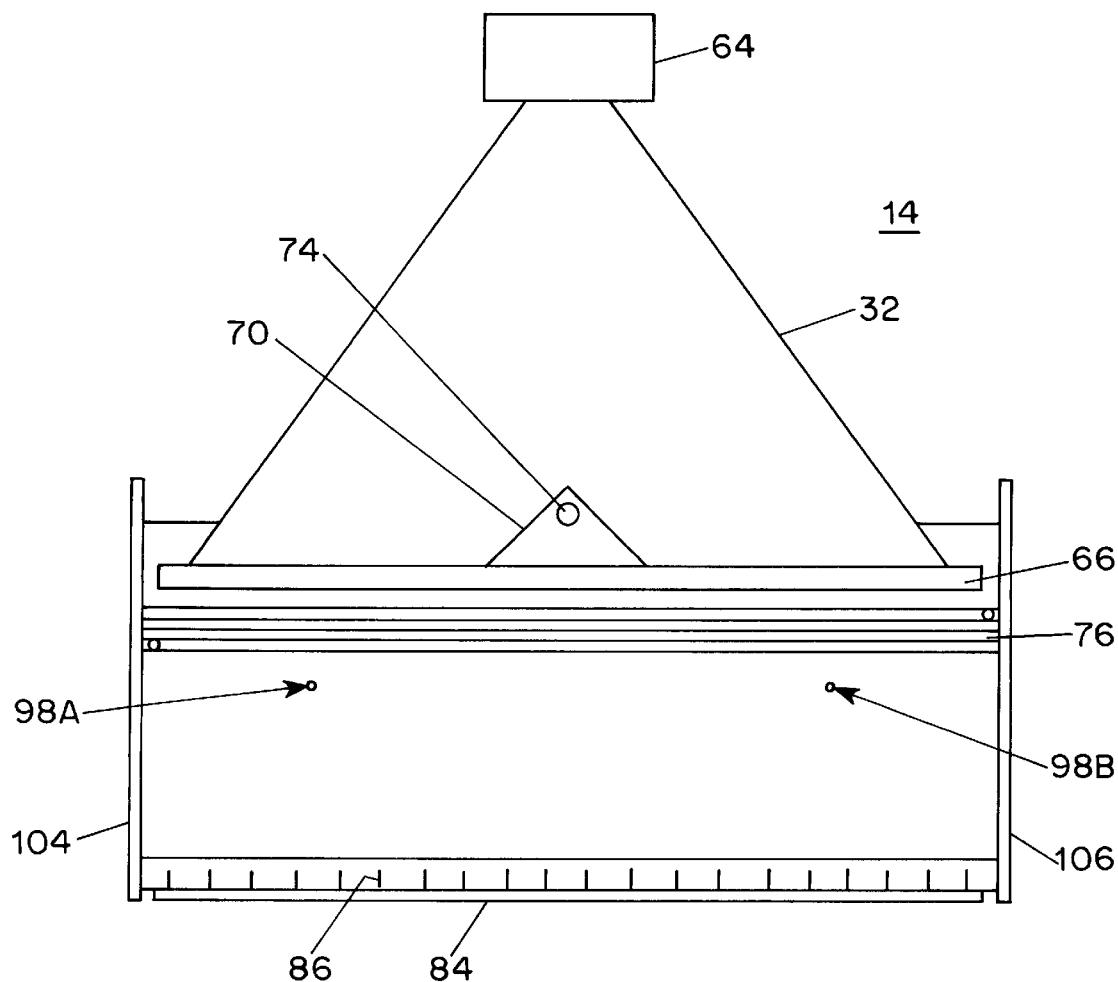
FIG. 6 is a second side elevation plan view of the FIG. 4 processing vessel.

The processing apparatus 14 is shown in transverse cross-section in FIG. 4, and in side view in FIGS. 5 and 6. The apparatus 14 comprises vessel 30 having first and second vessel portions 78 and 80 each containing a corresponding blender agitator, such as a ribbon agitators 88 and 90. The top of first vessel portion 78 has an upward extension 79 having air classifiers 34A, 34B and 34C (FIG. 5), each having a corresponding rotor 35 within extension 79. Vertical chute 100 connects screw conveyor 28 to extension 79 for purposes of supplying unprocessed material. As shown in the cross-sectional view of FIG. 4, the inner floor of vessel portion 78 is lower than the inner floor of vessel portion 80, providing a vertical step 82 of about 3.5 inches. An air manifold 84 provides heated compressed air at a temperature of 400 to 700° F. to be injected by nozzle 86 through the vertical portion of step 82 into the lower part of vessel portion 78. As shown in FIG. 6, about 20 nozzles are provided for a vessel 30 having a length of about 10 feet. Air is supplied at a pressure of about 50–100 psi at a volume of 400–1000 cfm, and preferably a temperature of about 450° F. Agitator 88 is preferably caused to turn in a counterclockwise direction such that grindable material in the vessel is conveyed transversely across the lower part of vessel portion 78 in a direction against the direction of the heated air injected by nozzles 86, to thereby promote grinding of the particles. Grinding is further promoted by the close spacing between the transverse side wall 81 of vessel portion 80 and agitator 90. The spacing between the periphery of agitator 90 and the interior of the side wall 81 is less than one inch, preferably approximately one-half inch, thereby promoting grinding of particles between agitator 90 and wall 81 in this narrow region. A larger spacing of about four inches is provided between the side wall of vessel portion 78 and agitator 88.

Grinding is also promoted by the action of agitators 88 and 90, which both rotate in the same counterclockwise direction, thereby providing further grinding in the space between the agitators at the transverse center of vessel 30 whereat the peripheries of agitators 88 and 90 are spaced approximately one inch apart. Irradiation of the material in the processing vessel is provided by an electron beam source 64 having a sectorial horn 32 which directs a scanning electron beam into processing vessel 30 at the top of second portion 80. For a processing vessel having a length of about 10 feet, a width of about four feet and a depth, not including extension 79 of about 2.5 feet, a radiation source providing electrons et an energy level of about 1.0 MeV a radiation beam current of about 100 mA is appropriate. Such electron sources can be obtained from Insulated core transformer or (High Voltage Accelerator). The window 66 of sectorial horn 32 is a double titanium window structure and is provided with input flange 68 and output flange 70 which provide a flow of cooling air from conduit 72, between the windows 66 of horn 32 and out through conduit 74.

Electron beam radiation from sectoral horn 32 passes through an opening 75 in the upper wall of vessel portion 80 to irradiate PTFE material as it passes through this region under the motion of agitator 90. By scanning the electron beam in horn 32, radiation is incident along the length of vessel 30. Cooling pipes 76, through which water at a temperature above the ambient dew point is passed, provide cooling for this region of vessel 30. The cooling water temperature is maintained above the dew point to prevent condensation of water, which can react with fluorine gas given off by the reaction in the vessel, forming corrosive hydrofluoric acid.

In order to maintain the proper level of PTFE material in the vessel 30, the vessel may be mounted on a scale to give a measure of its contents. However, since the density of the material increases as the chips are converted into powder, material height is determined by level sensors 92, 94, 96, 98. These sensors comprise tubes through which air is passed into the vessel at relatively low pressure, e.g. 1 PSI. A T-junction is provided, with the branch connected to a pressure sensor. The pressure monitored will be at a higher level when granular or powdered PTFE is present at the tube end in the vessel. Accordingly, by sensing the pressure in the tubes, a determination can be made of whether the material in the vessel is above or below the sensor level. The outward flow of air prevents clogging of the sensor tubes.

In order to process PTFE using the system of the present invention, unprocessed material, either virgin or scintered, is loaded into blender 24. If necessary, chopper 22 is used to reduce solid PTFE material into granular chips. The material is fed from blender 24 along conveyor 26 and screw conveyor 28 into vessel 30 via chute 100. During initial loading, agitators 88 and 90 may be operated to distribute the material.

After loading to a proper level as indicated by level sensors 92, 94, 96 and 98) radiation is supplied to the vessel while air is supplied to nozzles 86 and agitators 88 and 90 are rotated, all to supply grinding action. Air cooling about 150° F. by conduits 72, 74 is applied to window 66 and water cooling is supplied to cooling tubes 76. Classifiers 34 and blowers 38 are operated whereby air is removed from vessel 30 rendering the vessel at a pressure slightly below ambient. Air is drawn from the vessel at a total rate of abut 2500 CFM, while air is supplied to nozzles 86 at a rate corresponding to about 400 to 1000 CFM at atmospheric pressure. Accordingly, 2 to 5 times the amount of injected pressurized air is drawn into the vessel, for example, through the space between window 66 and cooling pipes 76. This additional air maintains the PTFE material at a temperature of about 250 to 300° F.

As radiation and grinding reduces the particle size and molecular weight of the PTFE to attain particles below about 10 microns, the smaller particles become air entrained and pass through the rotors 35 of classifiers 34 to be drawn from vessels 30. Classifiers 34 reject particles with larger size, which remain in the vessel. The separated particles are recovered in the separators 40 while the process air is exhausted. As material becomes denser during processing and/or material is removed from the vessel 30, sensors 92, 94, 96 and 98 provide an indication that further unprocessed material should be supplied from blender 24.

Recovered material may be subjected to further grinding, for example, in air mill, according to product particle size requirements.

While there have been described what are believed to be the preferred embodiments of the invention, it will be recognized by those skilled in the art that other and further changes may be made thereto without departing from the spirit of the invention and it is intended to claim all such changes and modifications as fall within the true scope of the invention.

We claim:

1. In an apparatus including a vessel for processing PTFE by irradiation and grinding, the improvement wherein said vessel includes transversely horizontally adjacent first and second vessel portions having corresponding first and second blender agitators arranged for rotation about parallel longitudinal axes, wherein the inner floor of said vessel has a step between said first and second vessel portions, whereby the inner floor of said first vessel portion is lower than the inner floor of said second vessel portion, and wherein there are provided a plurality of air nozzles for injecting air toward said first vessel portion, said nozzles being mounted on a substantially vertical portion of said step.

2. In the apparatus according to claim 1 wherein said first agitator in said first vessel portion is arranged for rotation about said longitudinal axis in a direction against the direction of air injected by said air nozzles in the lower part of said first vessel portion.

3. In the apparatus according to claim 2 wherein said second agitator in said second vessel portion is arranged for rotation about said longitudinal axis in the same rotational direction as said first agitator, whereby said agitators move in opposite relative directions at the transverse center of said vessel.

4. In the apparatus according to claim 3 wherein the transversely outer wall of said second vessel portion is cylindrical and the interior of said wall is spaced less than one inch from the periphery of said second agitator.

5. In the apparatus according to claim 4 wherein there is provided an electron beam generator for radiating electron beam radiation into the top of said second vessel portion.

6. In a continuous process for irradiating and grinding PTFE, wherein PTFE is supplied to a processing vessel and therein subjected to irradiation and grinding, and wherein air entrained processed PTFE particles are drawn from said vessel for collection, the improvement wherein said processing vessel is provided with pressurized air at a temperature of 400 to 700° F. for grinding said PTFE and wherein said processing vessel is open to allow ambient air into said vessel, said ambient air being drawn into said vessel in a volume of two to five times the volume of said pressurized air.

\* \* \* \* \*

UNITED STATES PATENT AND TRADEMARK OFFICE
CERTIFICATE OF CORRECTION

PATENT NO. : 5,968,997

DATED : OCTOBER 19, 1999

INVENTOR(S) : LUNIEWSKI ET AL.

It is certified that error appears in the above-identified patent and that said Letters Patent is hereby corrected as shown below:

COVER PAGE:

[54] TITLE: "POLYTETRAFLUORINEETHYLENE" should read --POLYTETRAFLUOROETHYLENE--.

IN THE DESCRIPTION:

Column 1, line 3: "polytetrafluorineethylene" should read --polytetrafluoroethylene--.

Signed and Sealed this

Fifteenth Day of May, 2001

Attest:

NICHOLAS P. GODICI

Attesting Officer     Acting Director of the United States Patent and Trademark Office